Nov. 24, 1942.     E. P. ROSS     2,302,894
GYROSCOPIC COMPASS
Filed Aug. 13, 1940     3 Sheets-Sheet 2
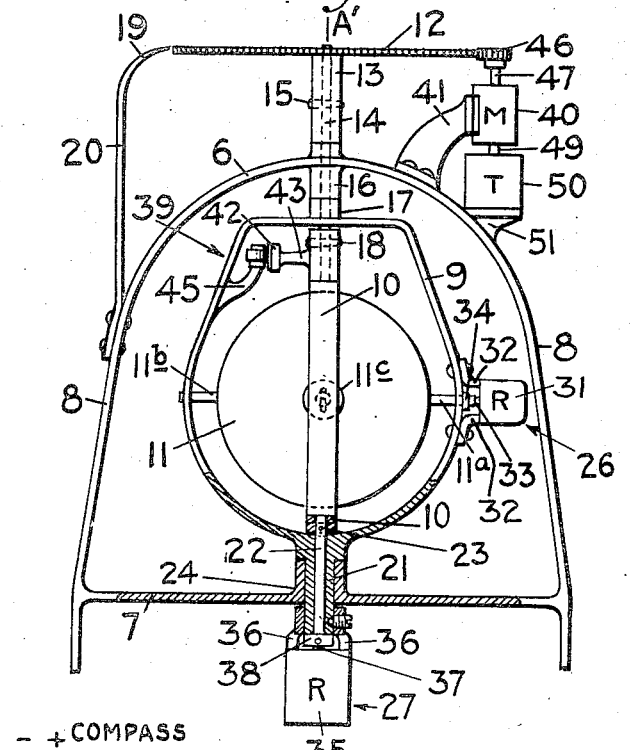
Fig. 2
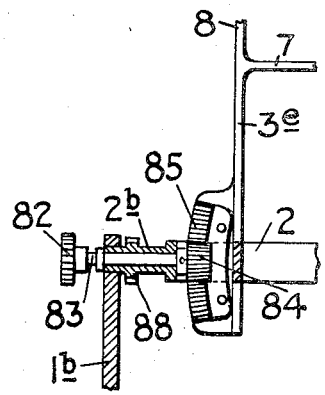
Fig. 3
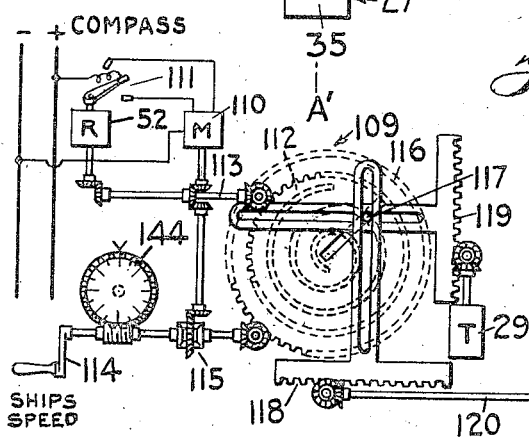
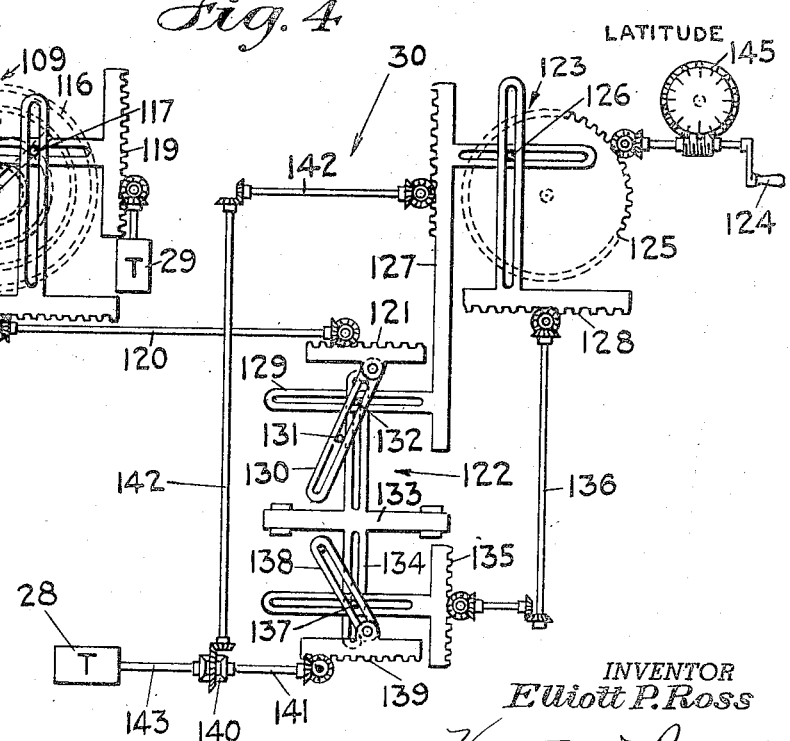
Fig. 4
INVENTOR
Elliott P. Ross
ATTORNEY

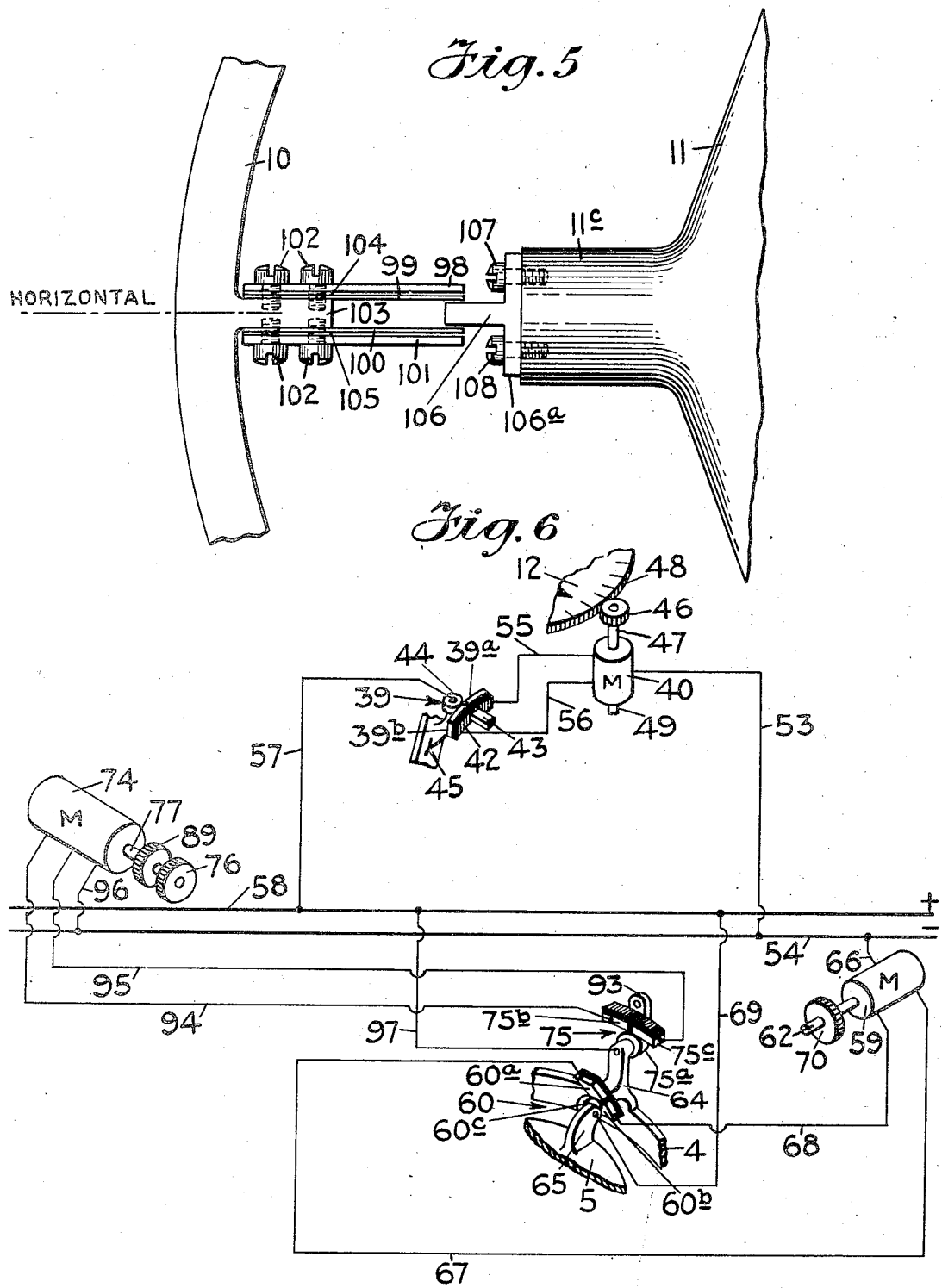

Patented Nov. 24, 1942

2,302,894

UNITED STATES PATENT OFFICE 2,302,894

GYROSCOPIC COMPASS

Elliott P. Ross, Forest Hills, N. Y., assignor to Ford Instrument Company, Inc., Long Island City, N. Y., a corporation of New York Application August 13, 1940, Serial No. 352,397

6 Claims. (Cl. 33—226)

This application is a continuation in part of an application entitled Gyroscopic compass, filed by me on January 11, 1939, Serial No. 250,287.

The invention herein disclosed relates to gyroscopic compasses and more particularly to a compass of this type wherein the customary pendulous gravity control is replaced by a suitable control from a stabilized base, and still further the invention relates to a compass adapted to having the axis of the gyroscope maintained continuously parallel to the surface of the earth.

It is a well known scientific fact that if a gyroscope be balanced in neutral equilibrium and mounted so as to relieve it of all disturbing influences and then set it in space, for example, with its axis parallel to the earth's axis of rotation, that it will retain this direction in space regardless of its position on the earth. Under these conditions the spin axis of the compass gyroscope will point to the pole of the heavens, and indicate not only the true north but the latitude of the place. If these conditions could be fulfilled, such a gyroscope would be the ideal compass.

The present gyroscopic compasses however are maintained with the axis of their gyroscopes tangent to the earth's surface by the use of gravity pendulous devices. These compasses when on the equator are not disturbed by the rotation of the earth when they are on the meridian, since the spin axes of their gyroscopes are then parallel to the axis of the earth. However, as these compasses are moved to a position north or south of the equator, their gyro axes are no longer parallel to the earth's axis and the rotation of the earth causes them to depart from the meridian. Consequently various forms of compensating devices are necessary to correct for the error commonly known as the latitude error. The angular movement of the axes of these compasses to maintain them horizontal as they are moved in a north-south direction causes a further tendency to depart from the meridian generally known as the north-south steaming error. The pendulums used to maintain the gyro axis horizontal introduce additional errors since they are disturbed by acceleration forces due to roll and pitch, and changes of speed and course of the ship. In accordance with one of the fundamental principles of the gyroscopic compass the north end of the gyro axle tends to fall due to the rotation of the earth, when it is west of the meridian and rise when it is east of the meridian. The use of this phenomenon to bring the gyro axis to the meridian is well known and is most pronounced when the compass is at the equator.

It is an object of the present invention to provide a gyroscopic compass which will rapidly seek the meridian and when on the meridian is not subject to disturbing forces such as are produced in pendulous gyroscopic compasses by acceleration forces due to roll and pitch of the ship.

It is another object of the invention to provide a gyroscopic compass mounted on rectangular axes which are stabilized horizontally and vertically with reference to the surface of the earth.

It is another object of the invention to provide a gyroscopic compass mounted for three degrees of freedom on rectangular axes which are stabilized horizontally and vertically with respect to the surface of the earth and to apply to the axes torques in proportion to the latitude, and course and speed of the ship.

In accordance with the invention these objects and certain advantages which will hereinafter appear are accomplished by taking advantage of the phenomenon described above. The disturbing forces on the gyroscopic compass due to roll and pitch are eliminated by the use of a gyroscopic stabilized base or frame. It is desirable that this base be of the type controlled by a pendulum to determine the vertical and compensated for accelerations. This base has a power-driven element for applying precession-inducing forces to the compass gyroscope so that these forces may react against this element but not directly on the stabilizing gyroscope. Such a base is disclosed in U. S. patent to Gillmor et al. No. 1,984,874.

The invention will now be more particularly described by reference to the embodiment illustrated in the drawings, and will be hereinafter pointed out in the claims.

In the accompanying drawings:

Fig. 2 is a sectional view taken along the line 2—2 of Fig. 1;

Fig. 3 is a sectional view partly broken away taken along the line 3—3 of Fig. 1;

Fig. 4 is a schematic diagram of a mechanism for computing correctional precessing forces to be applied to the compass gyroscope;

Fig. 5 is an enlarged side view partly broken away, showing another form of spring connection; and Fig. 6 is a wiring diagram showing the operation of the follow-up systems in Fig. 1.

Figure 1:
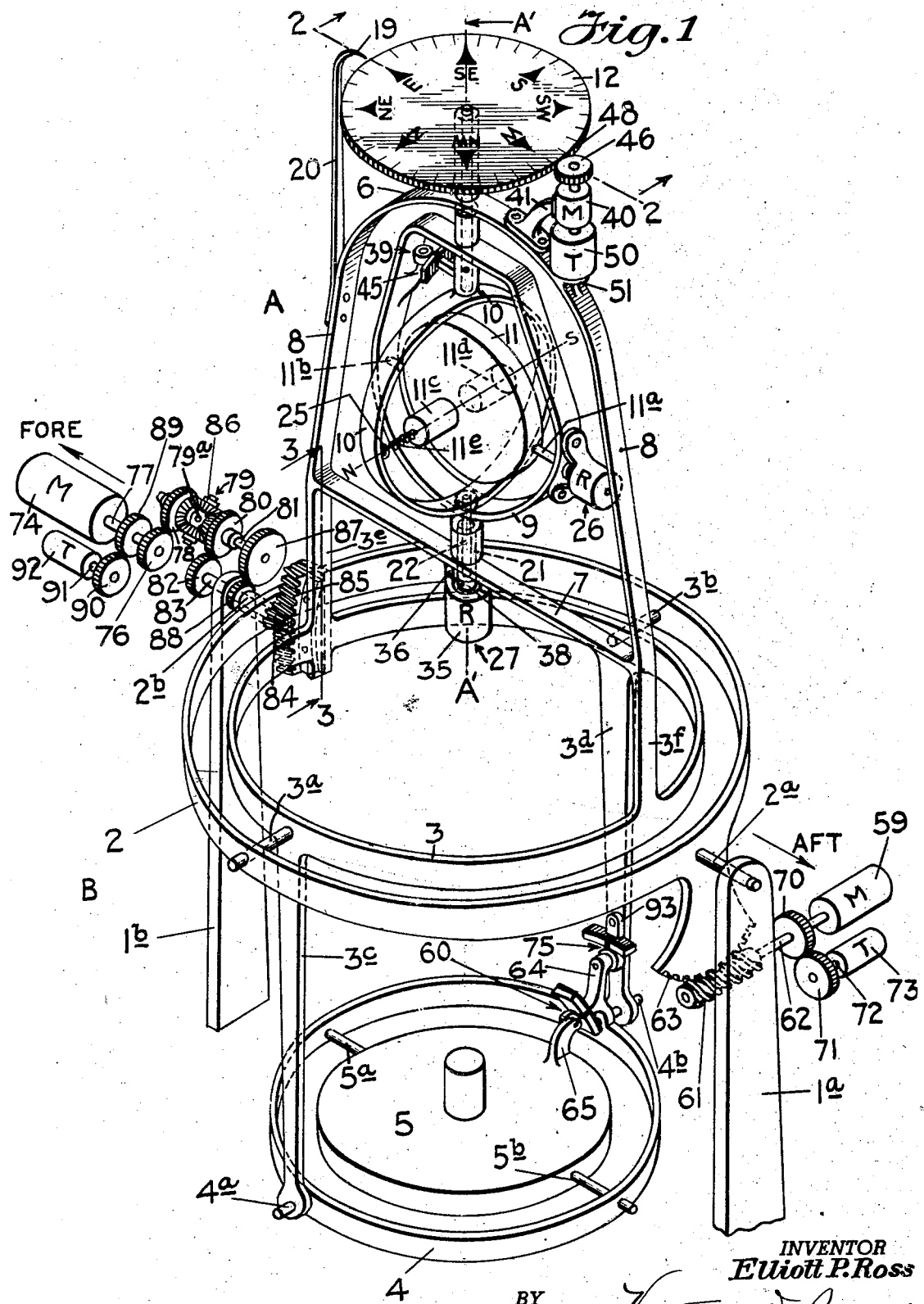
Fig. 1 is an isometric view illustrated somewhat diagrammatically of a gyroscopic compass and mechanism embodying the invention.

The mechanism illustrated in Fig. 1 consists of a gyroscopic compass A and a gyroscopic stabilized base or support B.

The base B consists of a pair of standards 1a and 1b which are permanently secured to the deck of the ship upon which the mechanism is mounted. The construction illustrated in Fig. 1 the standards 1a and 1b form bearings for trunnions 2a and 2b that extend from a gyroscope frame 2. The standards 1a and 1b are so positioned that the axes of the trunnions 2a and 2b of the frame are parallel to the fore and aft line of the ship. Within the frame 2 there is mounted a ring 3. The ring 3 has trunnions 3a and 3b that are journaled in the frame 2, the axes of these trunnions being athwartship or at an angle of 90° to the trunnion axis of the frame 2. Integral with opposite points of the lower edge of the ring 3 are downwardly extending arms 3c and 3d from the lower ends of which are suspended a gimbal ring 4 which carries a gyroscope 5. The ring 4 has trunnions 4a and 4b that are journaled near the ends of the arms 3c and 3d respectively, and the gyroscope 5 is mounted for oscillatory movement about the trunnions 5a and 5b journaled in the gimbal ring 4. Integral with the upper edge of the ring 3 and disposed at an angle of 90° from the arms 3c and 3d, are upwardly extending arms 3e and 3f which are joined together at their upper and approximately mid-section points by integral portions 6 and 7, respectively, to form a frame 8.

The gyroscopic compass A consists of a vertical gimbal ring 9, a vertical or driven ring 10, a gyroscope 11 mounted for oscillatory movement within the ring 10, and a compass card 12. As shown more clearly in Fig. 2, the compass card 12 has a hollow integral hub 13 which fits over one end of a rod 14 and to which it is secured by means of a pin 15. This rod is journaled for rotatable movement with the compass card in a boss 16 on the part 6 of the frame 8 and another boss 17 on top of the ring 9. The other end of this rod is secured to the driven ring 10 by means of a pin 18. The lubber's point, or the point indicating the ship's head, is represented by the upper end 19 of a rod 20 secured to the frame 8. The vertical gimbal ring 9 is rotatably mounted for movement about a vertical axis A'—A', the upper end for movement about the rod 14 by means of the journal in the boss 17, and the lower end by means of a trunnion 21 journaled in a boss 24 on the part 7 of the frame 8. The trunnion rod 22 rotates in the trunnion 21 and is secured to the driven ring 10 by pin 23. The driven ring 10, as already mentioned, is secured at its upper end to the rod 14 for movement about the vertical axis with the compass card. The gyroscope 11 is rotatably mounted within the gimbal ring 9 for movement about trunnions 11a and 11b which are journaled in the gimbal ring 9. Hubs 11c and 11d of the gyroscope 11, as shown in Fig. 1, have their axes in the north-south plane.

In order to take advantage of the fundamental principle of the gyroscope, that the north end of the axle of the gyroscope tends to fall due to the rotation of the earth when west of the meridian and rise when it is east of the meridian, an inwardly extending eye 25 is provided on the horizontal centerline of the driven ring 10. The hub 11c at the north end of the gyroscope 11 is connected by means of a spring 11e to the eye 25.

Precessing forces for causing the spin axis of the gyroscope 11 to remain in the meridian plane as the earth rotates and to remain horizontal as the compass is carried in a north-south direction by movement of the ship are applied by the torque motors 26 and 27 respectively, under the control of transmitters 28 and 29 which represent the outputs of the computing mechanism 30 shown in Fig. 4, as will be described later. The stator 31 of the motor 26 is secured to the gimbal ring 9 by brackets 32 and the shaft 33 of the rotor is rotatably secured to the trunnion 11a by the coupling 34. The stator 35 of the motor 27 is secured to an extension of the trunnion 21 by brackets 36 and the shaft 37 of the rotor is rotatably secured to the trunnion rod 22 by the coupling 38. It is to be understood that suitable slip rings or flexible leads will be provided for the electrical connections to the torque motors.

In order to maintain the plane of the driven ring 10 in fixed relationship to the gimbal ring 9 of the gyroscope 11, and consequently, to transmit the true north heading of the gyroscope to the compass card 12, use is made of a follow-up motor 40 controlled by means of electrical contacts 39. The follow-up motor 40 is mounted on and secured to the part 6 of the frame 8 by means of a bracket 41. The contacts 39, see Fig. 6, include a pair of spaced electrically insulated contacts 39a and 39b that are mounted on a bracket 42, secured to the ring 10, by means of an arm 43, and a roller contact 44 that is mounted on a bracket 45 integral with the gimbal ring 9 of the gyroscope 11. As relative movement between the gimbal ring 9 and the ring 10 occurs about the axis A'—A', the contact 44 rides off the central insulated section between the contacts 39a and 39b and on to one or the other of the contacts. Such contact between the contacts 44 and 39a or 39b causes the operation of the motor 40, by electrical connections, hereinafter to be described and shown in Fig. 6, to drive the ring 10 in a direction to restore the proper angular relationship between the gimbal ring 9 and the driven ring 10. This is effected by means of a pinion 46 secured to one end of a shaft 47 and driven by the motor 40. The pinion 46 meshes with gear teeth 48 on the periphery of the compass card 12. Since the compass card is connected to the driven ring 10 by means of the rod 14, movement of the motor 40 is communicated to the ring 10. The other end 49 of the motor shaft 47 is connected to a transmitter 50 mounted on a bracket 51. The transmitter 50 transmits the heading of the ship to the customary repeater motors located about the ship and to a repeater motor 52 by which the compass heading of the ship is introduced in the computing mechanism 30.

To effect the operation of the follow-up motor 40, as shown in Fig. 6, a wire 53 connects one side of the motor to a line wire 54. The contacts 39a and 39b are separately connected to the motor through wires 55 and 56 respectively, and the roller contact 44 is connected by means of a wire 57 to the other line wire 58.

Since the construction of the stabilized base B is well known in the art and may be of the type described and shown in the above mentioned patent, only such parts have been illustrated in the drawings that are pertinent to this invention. The description therefore of the base B will be limited to the manner in which it cooperates as a whole in the combination in which it occurs with the other elements in this invention. Referring again to Fig. 1 the operating mechanism of the base will now be briefly described.

The stabilized base B is utilized to maintain the frame 8 and consequently the gyroscopic compass A within which frame it is mounted, continuously in the vertical, that is, the axis A'—A' is continuously maintained vertical. Due to the use of a stabilized base from which to apply the precessional corrections to the compass gyroscope, no effect from accelerations due to roll and pitch or change of ship's speed and course is communicated to the compass gyroscope.

Due to the pendulous controls, not shown, the axis of the gyroscope 5 is maintained continuously vertical. These pendulous controls are preferably compensated for the forces due to accelerations such as are produced by change of course and speed of the ship as described and illustrated in the above mentioned patent. As the ship rolls and pitches, motor operated follow-up mechanisms cooperate to maintain the ring 3 continuously horizontal and the axis A'—A' parallel to the axis of the gyroscope 5 in the following manner.

Movement of the gyroscope 5 about the axes 5a and 5b relative to the gimbal ring 4 controls the movement of the frame 2 about the trunnions 2a and 2b. This movement of the frame 2 is effected through a follow-up motor 59 and electrical contacts 60. The follow-up motor 59 is connected to the frame 2 through a worm 61 mounted upon a shaft 62 of the motor 59 and a segmental worm gear 63 integral with the frame 2. The worm gear 63 is concentric with the trunnion axis of the frame 2. The contacts 60 include a pair of spaced, electrically insulated contacts 60a and 60b (Fig. 6) that are mounted on a bracket 64 secured to the gimbal ring 4, and a roller contact 60c that is mounted on a bracket 65 secured to the casing of the gyroscope 5. To effect the operation of the motor 59 a wire 66 connects one side of the motor to a line wire 54. The contacts 60a and 60b are separately connected to the motor through wires 67 and 68 respectively and the roller contact 60c is connected by means of a wire 69 to a line wire 58. Mounted on the shaft 62 between the motor 59 and the worm 61 is a gear 70 which meshes with a gear 71 mounted on a shaft 72 of a transmitter 73. It will be understood that the motor 59, worm 61 and transmitter 73 with the connecting shaft and gearing are suitably mounted on the standard 1a by mountings not shown.

As relative movement between the gyroscope 5 and the gimbal ring 4 occurs about the trunnions 5a and 5b, the contact 60c rides off of the central insulated section between the contacts 60a and 60b and on to one or the other of the contacts. Such contact between the contact 60c and the contact 60a or 60b causes the operation of the motor 59 to rotate the frame 2 about the axis 2a and 2b in a direction to restore the proper angular relationship between the gimbal ring 4 and the gyroscope 5. This movement of the frame 2 is communicated to the ring 3 by means of the trunnions 3a and 3b and to the gimbal ring 4 by the arms 3c and 3d by means of which the ring 4 is supported.

Similarly, movement of the gyroscope 5 and the gimbal ring 4 about the trunnions 4a and 4b relative to the ring 3 controls the movement of the ring 3 about the trunnions 3a and 3b. This movement of the ring 3 is effected through a follow-up motor 74 and electrical contacts 75. The follow-up motor 74 is connected to drive the ring 3 as follows: a gear 76 mounted on the shaft 77 of the motor meshes with a gear 78 connected to one side of a compensating differential 79; the other side of the differential is connected to a gear 80 freely mounted on shaft 81 and meshing with a gear 82 secured to one end of a shaft 83; on the other end of the shaft 83 is secured a bevel pinion 84 which meshes with the arcuate rack 85 mounted on the arm 3e of the frame 8; the shaft 81 is secured at one end to the spider 86 of the differential 79 by a pin 79a and at the other end carries a gear 87; the gear 87 meshes with a gear 88 integral with the trunnion 2b of the frame 2; the trunnion 2b is journaled to receive the shaft 83 freely rotatable therein. It will be seen that as the frame 2 rotates relative to the standard 1b, the gear 84 will be rotated therewith, through the compensating differential 79, by means of the gears 88 and 87, the shaft 81, spider 86, gears 80, 82 and the shaft 83. Mounted on the shaft 77 between the motor 74 and the gear 76 is a gear 89 which meshes with a gear 90 mounted on the shaft 91 of a transmitter 92. It will be understood that the motor 74, transmitter 92, differential 79, associated shafts and gearing are suitably mounted on the standard 1b by mountings not shown. The electrical contacts 75 include a roller 75a (Fig. 6) that is mounted on the bracket 64 which is secured to the gimbal ring 4 and two spaced electrically insulated contacts 75b and 75c that are mounted on a bracket 93 secured to the arm 3d near its lower end. To effect the operation of the motor 74, the contacts 75b and 75c are connected to the motor by wires 94 and 95 respectively. The common of the motor 74 is connected to the negative line wire 54 by a conductor 96 and the other line wire 58 is connected by a conductor 97 to the roller 75a.

As relative movement between the gimbal ring 4 and the ring 3 occurs about the trunnions 4a and 4b, the roller 75a rides upon one or the other of the contacts 75b or 75c and effects operation of the motor 74. The operation of the motor 74 rotates the ring 3 about the axis 3a and 3b and the proper angular relationship between the gimbal ring 4 and the ring 3 is maintained.

From the foregoing it will be seen that the ring 3 corresponds at all times with the gyroscope 5. Since the spin axis of the gyroscope is vertical the ring 3 will be horizontal and represent a true horizontal plane. Consequently, the axis A'—A' of the gyroscope A, is maintained continuously vertical.

The transmitter 73 transmits the motion due to the roll of the ship and the transmitter 92 transmits the motion due to the pitch of the ship, and these motions may be combined together to maintain another object remotely situated in a true horizontal plane.

It will be apparent that instead of a composite unit as shown, the compass A may be separated from the stabilized mount B to form separate units with appropriate connections to maintain the axis A'—A' vertical, that is, parallel to the axis of the gyroscope 5.

In Fig. 5 is shown a preferred form of spring connection between the gyroscope 11 and the driven ring 10. Upper and lower spaced spring leaf members, in pairs, 98, 99 and 100, 101 are secured by screws 102 to a bracket 103 integral with the driven ring 10 at its horizontal centerline. The outer member of each pair of these springs, or the members 98 and 101, are made of heavier material than that of the inner members 99 and 100. The outer spring members are separated from the inner members by distance pieces 104 and 105. A lug 106 integral with a bracket 106a is secured by screws 107 and 108 to the hub 11c of the gyroscope 11. The lug 106 is operatively associated with the spring members and these members resist any tendency of the lug 106 to change its position relative to the horizontal.

In accordance with one of the fundamental principles of the gyroscopic compass already described, that the north end of the axis of the gyroscope tends to fall due to the rotation of the earth when west of the meridian and rise when it is east of the meridian; if the axis of the gyroscope departs from the meridian toward the east thus causing the hub 11c to rise; the lug 106 will contact one of the upper pair of spring members; the reaction of the spring will cause the gyroscope 11 to precess in a direction which will return the axis to the meridian. Similarly, departures west of the meridian will cause the hub 11c to fall, so that the lug 106 will contact one of the lower spring members. The reaction of this spring will cause the gyroscope to precess in a direction which will return the axis to the meridian. Any tendency for small departures from the meridian on the part of the axis will be resisted by the smaller spring members 99 and 100. Larger departures from the meridian, however, such as would occur in starting up the compass, will cause the heavier springs 98 and 101 to come into action, whereupon the reaction thereof will cause the compass to rapidly precess to the meridian.

It will be seen that the operation of the spring 11e of Fig. 1 will be effective in a similar manner to cause the axis of the gyroscope to rapidly seek the meridian on departure therefrom. The follow-up contacts 39a and 39b are so connected and arranged that the follow-up motor 40 maintains the rings 9 and 10 in a relatively fixed relationship, and the departure from this relationship is never sufficient to permit any appreciable torque to be produced about the vertical axis $A'—A'$ by the spring 11e. Consequently the only effective torque applied to the gyroscope by the spring 11e is about the horizontal axis 11a—11b, the same as the torque applied by the leaf spring members of Fig. 5.

As pointed out in the patent of Hannibal C. Ford, Number 1,628,136, a precessing torque may be applied to the compass gyroscope about its vertical mounting axis to cause it to precess about its horizontal or east-west trunnion axis so that the spin axis remains horizontal as the craft on which it is mounted changes latitude. Likewise torques may be applied about the east-west trunnion axis to cause the gyroscope to precess about its vertical mounting axis so that its spin axis remains in the meridian plane regardless of the rotation of the earth or east-west movement of the craft on which it is mounted. By continuously applying such torques, the spin axis of the gyroscope will remain in the meridian plane except for wandering due to friction or variations in the precessing torques. These wanderings are corrected by the spring connection to the stabilized base as shown at 11e in Fig. 1 or in a preferred form in Fig. 5.

The value of the correction torques to be applied to the compass gyroscope may be determined as shown in Patent No. 1,628,136 above referred to or by other means, one of which is shown in Fig. 4. It is evident that the torque necessary to cause the spin axis of the gyroscope to remain horizontal is that torque which will precess the gyroscope at the angular rate of north-south movement of the craft relative to the earth and is proportional to $So.\cos Co$ where $So$ is the speed of the craft and $Co$ is the course or direction of movement of the craft relative to the meridian plane. The torque required to precess the gyroscope to stay on the meridian as the earth rotates and the craft moves in an east-west direction is proportional to $$\sin L + So \cdot \sin Co \cdot \tan L$$

where $L$ equals the latitude. Appropriate constants will be included in each equation to allow for the characteristics of the particular gyroscope to which they are applied.

Referring now to Fig. 4, as already pointed out, the receiver motor 52 is actuated in accordance with the heading of the ship $Co$. The angle thus received is introduced in a component solver 109 by a servomotor 110 controlled by follow-up contacts 111 which are associated with the receiver motor 52 in the well known manner. The servomotor 110 rotates a vector gear 112 by a shaft 113 and associated gearing. The ship speed $(So)$ is introduced by a handcrank 114, and a customary compensating differential 115, to a gear 116 which carries a spiral cam to control the length of the vector. The direction and length of the vector representing ship's motion is represented by a pin 117 which locates component slides 118 and 119 in accordance with the sine and cosine of the ship's movement. The slide 119 drives the transmitter 29 to transmit values proportional to $So.\cos Co$ to the torque motor 27. The slide 118 through shafting 120 locates an input slide 121, of a compound multiplying and dividing mechanism 122, in accordance with $So \sin Co$.

A component solver 123 is set for latitude of the craft by a handcrank 124 which rotates a gear 125 carrying a pin 126 which locates two component slides 127 and 128 in accordance with the sine and cosine of the latitude. The sine slide 127 carries an arm 129 which acts as a second input to the mechanism 122. An arm 130 pivoted at a point 131 is located angularly by the input slide 121 and a pin 132 located by the intersection of the arm 129 and the arm 130 determines the position of the cross slide 133 in accordance with $So.\sin Co.\sin L$. The cross slide 133 carries an arm 134 which cooperates with a slide 135 located in accordance with $\cos L$ by the slide 128 and connecting shafting 136 to locate a pin 137. This pin in turn locates an output arm 138 and slide 139 in accordance with $$\frac{So.\sin Co.\sin L}{\cos L}$$

which is the equivalent of $So.\sin Co.\tan L$. The movement of this slide 139 is introduced in differential 140 by shafting 141 and combined with $\sin L$ as introduced by shafting 142 actuated by the slide 127. The combined values $\sin L + So.\sin Co.\tan L$ rotate the shaft 143 and the transmitter 28 to transmit the desired value to the torque motor 26. The torque motors 26 and 27 are of a type in which the torque is proportional to the displacement of the controlling transmitter.

Dials 144 and 145 are actuated by the hand cranks 114 and 124 to indicate the values of ship's speed and latitude respectively. It is evident that these values may be introduced automatically by suitable connections to the ship's log and dead reckoning mechanism.

It will be obvious that various changes may be made by those skilled in the art in the details of the embodiment of the invention disclosed in the drawings and described above within the principle and scope of the invention as expressed in the appended claims.

I claim:

1. In a gyroscopic compass on a moving craft, the combination of a stabilizing gyro-vertical adapted to maintain a horizontal plane, a universally mounted frame, power-driven follow-up means controlled by said gyro-vertical for driving said frame in accordance with the position of the gyro-vertical to maintain said frame horizontal, a compass gyroscope having horizontal and vertical supporting axes mounted in the frame, means for applying a torque to the gyroscope about its vertical supporting axis proportional to functions of the course and speed of the craft, a ring mounted in said frame adapted to angular movement about a vertical axis, means to move said ring about its vertical axis in accordance with the movement of the gyroscope about its vertical axis, and precession-inducing means connected to the ring and to the gyroscope adapted to restore the spin axis of said gyroscope to the meridian plane upon angular movement of the gyroscope relative to the frame, due to the departure of the spin axis of said gyroscope from the meridian plane.

2. In a gyroscopic compass on a moving craft, the combination of a stabilizing gyro-vertical adapted to maintain a horizontal plane, a universally mounted frame, power-driven follow-up means controlled by said gyro-vertical for driving said frame in accordance with the position of the gyro-vertical to maintain said frame horizontal, a compass gyroscope having horizontal and vertical supporting axes mounted in the frame, means for applying a torque to the gyroscope about its horizontal supporting axis proportional to functions of the course, speed and latitude of the craft, a ring mounted in said frame adapted to angular movement about a vertical axis, means to move said ring about its vertical axis in accordance with the movement of the gyroscope about its vertical axis, and precession-inducing means connected to the ring and to the gyroscope adapted to restore the spin axis of said gyroscope to the meridian plane upon angular movement of the gyroscope relative to the frame, due to the departure of the spin axis of said gyroscope from the meridian plane.

3. In a gyroscopic compass for use on a moving craft, the combination of a stabilizing gyro-vertical adapted to maintain a horizontal plane, a universally mounted frame, power-driven follow-up means controlled by said gyro-vertical for driving said frame in accordance with the position of the gyro-vertical to maintain said frame horizontal, a compass gyroscope pivoted on supporting axes for three degrees of freedom in said frame, means for applying torques to the gyroscope about its vertical supporting axis proportional to functions of the course and speed of the craft and about the horizontal supporting axis proportional to functions of the course, speed and latitude of the craft, a ring mounted in said frame adapted to angular movement about a vertical axis, means for moving said ring about its vertical axis in accordance with the angular movement of the gyroscope about its vertical axis, and precession-inducing means connected to the ring and to the gyroscope adapted to restore the spin axis of said gyroscope to the meridian plane upon angular movement of the gyroscope relative to the frame, due to the departure of the spin axis of said gyroscope from the meridian plane.

4. In a mechanism of the type described for adjusting the spin axis of a compass gyroscope for use on a moving craft, the combination with a compass gyroscope pivoted on supporting axes for three degrees of freedom and movably mounted for movement about stabilized horizontal and vertical axes and having a lug on the casing thereof, of means for applying torques to the gyroscope about its vertical supporting axis proportional to functions of the course and speed of the craft and about its horizontal supporting axis proportional to functions of the course, speed and latitude of the craft, a ring mounted for angular movement about said vertical axis, means for moving said ring about its vertical axis in accordance with the angular movement of said gyroscope about its vertical axis, and precession-inducing means adapted to interconnect the ring and the lug for maintaining the spin axis of the gyroscope in a meridianal direction, including a plurality of yieldable members mounted on the ring and disposed adjacent and above and below said lug and in cooperative relation therewith, the reaction of some of said members caused by the angular movement of the gyroscope about said horizontal axis relative to the members on departure of the spin axis of the gyroscope from the meridian due to the rotation of the earth being adapted to induce and apply small precessing forces to the gyroscope for small departures from the meridian to return the spin axis to the meridian and to correct the tendency of the gyroscope to wander when substantially on the meridian, and other of said members being adapted to induce and apply larger precessing forces to the gyroscope to return the spin axis to the meridian for larger departures from the meridian.

5. In a gyroscopic compass for use on a moving craft the combination of a stabilizing gyro-vertical adapted to maintain a horizontal plane, a universally mounted frame having a reference plane, power driven follow-up means controlled by said gyro-vertical for driving said frame in accordance with the position of the gyro-vertical to maintain said reference plane horizontal, a compass gyroscope mounted on said frame, said gyroscope having horizontal and vertical supporting axes parallel and perpendicular to said reference plane respectively, means reacting on said frame to apply a torque to the gyroscope about its horizontal supporting axis proportional to vertical angular displacements of the spin axis of the gyroscope from parallelism with the reference plane, and means to apply a second torque to the gyroscope about its horizontal supporting axis proportional to functions of the course, speed and latitude of the craft.

6. In a gyroscopic compass for use on a moving craft the combination of a stabilizing gyro-vertical adapted to maintain a horizontal plane, a universally mounted frame having a reference plane, power driven follow-up means controlled by said gyro-vertical for driving said frame in accordance with the position of the gyro-vertical to maintain said reference plane horizontal, a compass gyroscope mounted on said frame, said gyroscope having horizontal and vertical supporting axes parallel and perpendicular to said reference plane respectively, means reacting on said frame to apply a torque to the gyroscope about its horizontal supporting axis proportional to vertical angular displacements of the spin axis of the gyroscope from parallelism with the reference plane, and means to apply a torque to the gyroscope about its vertical supporting axis proportional to functions of the course and speed of the craft.

ELLIOTT P. ROSS.